United States Patent [19]

Urban et al.

[11] 4,076,919
[45] Feb. 28, 1978

[54] MANUFACTURE OF ETHYLENE POLYMERS IN A TWO-ZONE TUBULAR REACTOR AT PRESSURE ABOVE 500 BARS

[75] Inventors: Friedrich Urban, Limburgerhof; Oskar Buechner, Dudenhofen; Ulrich Hartig, Neckargemuend; Hans Gropper, Ludwigshafen, all of Germany

[73] Assignee: BASF Aktiengesellschaft, Ludwigshafen, Germany

[21] Appl. No.: 741,939

[22] Filed: Nov. 15, 1976

[30] Foreign Application Priority Data

Dec. 20, 1975 Germany ............................ 2557653

[51] Int. Cl.$^2$ .......................... C08F 4/28; C08F 10/02
[52] U.S. Cl. ....................................... 526/64; 526/65; 526/86
[58] Field of Search ............................ 526/64, 65, 86

[56] References Cited

U.S. PATENT DOCUMENTS

| | | | |
|---|---|---|---|
| 3,142,666 | 7/1964 | Deex | 526/64 |
| 3,293,233 | 12/1966 | Erchak, Jr. et al. | 526/64 |
| 3,334,081 | 8/1967 | Madgwick et al. | 526/64 |
| 3,546,189 | 12/1970 | Ratzsch et al. | 526/64 |
| 3,657,212 | 4/1972 | Steigerwald et al. | 526/64 |
| 3,702,845 | 11/1972 | Steigerwald et al. | 526/64 |

Primary Examiner—Alan Holler
Attorney, Agent, or Firm—Keil, Thompson & Shurtleff

[57] ABSTRACT

Ethylene polymers are manufactured in a tubular reactor under high pressure and at high temperatures in the presence of polymerization initiators. The polymerization is carried out in two different zones of the reactor, a mixture of ethylene, oxygen and regulator being fed into the first zone and a co-initiator having a half-life temperature, measured in benzene, of above 140° C being additionally fed into the second zone. The co-initiator may be a peroxide or a hydroperoxide. The melt index, or the haze and gloss of a film produced from the resulting ethylene polymer, can be varied advantageously through the choice of the co-initiator.

5 Claims, No Drawings

MANUFACTURE OF ETHYLENE POLYMERS IN A TWO-ZONE TUBULAR REACTOR AT PRESSURE ABOVE 500 BARS

The present invention relates to a process for the manufacture of ethylene polymers.

The ethylene polymers are manufactured by homopolymerization of ethylene or copolymerization of ethylene with other compounds, which are copolymerizable with ethylene, in a continuously operated tubular polymerization system at pressures of from 500 to 5,000 bars and at from 50° to 450° C, in the presence of polymerization initiators which generate free radicals, by feeding a mixture of ethylene, oxygen and regulator, with or without comonomers, into the polymerization system at the inlet and, at the same time, at a second point downstream from the inlet and along the polymerization system, at which point the reaction temperature reaches a maximum.

The polymerization of ethylene in tubular polymerization systems at pressures of from 500 to 5,000 bars and at from 50° to 450° C, in the presence of polymerization initiators which generate free radicals, such as oxygen, or of peroxide initiators, in the presence or absence of regulators and of co-reactants, has been disclosed. It has also been disclosed that in the high-pressure polymerization of ethylene in tubular reactors, catalysts of the stated type, in the form of solutions or suspensions, can be fed into the reactor at successive points in the direction of flow of the ethylene. However, in these processes, the temperature of the reactor cannot be regulated reliably for prolonged periods, and this leads to charring of the reaction mixture and to blocking of the reactor.

It has also been disclosed that in the high pressure polymerization of ethylene the stream of ethylene containing the catalysts can be divided into several part-streams and that one of these part-streams can then, after having been heated to the starting temperature, be fed into the inlet of a tubular reactor. In this conventional process, the other part-stream or stream are then fed cold into the reactor at several successive points in the direction of flow of the ethylene undergoing polymerization.

In this process, the cold ethylene is fed into the reactor at the point at which the polymerization mixture in the reactor has reached approximately the maximum permissible polymerization temperature. The amount of the cold ethylene, containing initiator, which is fed in is so chosen that the temperature of the reaction mixture in the reactor does not fall below the starting temperature of the ethylene polymerization, which temperature depends on the catalyst used. In this way it is possible, under special conditions, to increase the conversion of ethylene to polyethylene per pass. Small amounts of atmospheric oxygen are added, as the polymerization initiator, to the ethylene before or after compression. Instead of atmospheric oxygen, peroxides or hydroperoxides or mixtures of peroxide compounds may be added (compare U.S. Pat. No. 3,725,378).

However, feeding additional streams of ethylene into the tubular reactor, in accordance with the process described above, results in a deterioration of the optical properties of the polyethylene formed.

It is an object of the present invention to provide an improved process for the polymerization of ethylene in a tubular polymerization system, wherein the conversion of ethylene to polyethylene per pass is increased without deterioration of the product quality.

We have found that this object is achieved, according to the invention, by additionally feeding in a co-initiator exclusively at the second feed point, the half-life temperature of the co-initiator, measured in benzene as the solvent, being at least 40° C.

Advantageously, the concentration of the co-initiator is from 0.2 to 20 mole ppm based on the total amount of ethylene fed into the polymerization system.

The process of the invention is applicable to the homopolymerization of ethylene and to the copolymerization of ethylene with other compounds which are copolymerizable with ethylene. These compounds may be any which can conventionally be copolymerized with ethylene under high-pressure conditions in the presence of polymerization initiators which generate free radicals. Examples of such compounds are vinyl acetate, n-butyl acrylate, methyl acrylate, acrylonitrile, vinyl ethers, acrylic acid and acrylamide.

The polymerization of the ethylene, with or without other compounds, is carried out at pressures of from 500 to 5,000 bars, preferably from 1,500 to 3,000 bars. The temperatures in the polymerization system are from 50° to 450° C, preferably from 150° to 350° C. The conditions in the polymerizaton system can be achieved by using tubular reactors as the apparatus. Tubular reactors are tubular polymerization vessels, the length of which is more than 2,000 times, preferably from 5,000 times to 50,000 times, the diameter of the tube. A part of the heat of polymerization is conducted away by externally cooling the tubular reactor with water, in the conventional manner. The polymerization of the ethylene in the tubular reactor is carried out continuously.

The polymerization of the ethylene in the process of the invention is initiated by introduction of atmospheric oxygen, at a concentration of from 3 to 500, preferably from 5 to 100, mole ppm, based on the amount of ethylene. The gaseous mixture of ethylene and oxygen, which may or may not contain regulators and comonomers, is fed into the reactor at its inlet and at the same time at a second point, downstream from the inlet, along the tubular reactor in the direction of flow of the polymerizing ethylene, approximately at a point where the reaction temperature has reached a maximum, in accordance with the process of U.S. Pat. No. 3,725,378, cited above. The inlet is in general the starting end of the tubular reactor. The main stream is fed in at this point, whilst the subsidiary stream is fed into the reactor, in the conventional manner, in the vicinity of the second point, where the temperature reaches a maximum. In this way, the reaction conditions of the conventional two-zone tubular reactor are achieved.

The molecular weight of the polymer formed may be brought to the desired value by conventional regulators, eg. propane, propylene, acetone and methyl ethyl ketone.

In the improved process of the invention, a co-initiator, dissolved in an inert solvent, is additionally fed in at the second feed point along the reactor, which is downstream from the starting end of the tubular reactor and into which the subsidiary stream of a mixture of ethylene, oxygen and regulator, with or without comonomer, is fed. The said co-initiator or free radical donor should have a half-life temperature (T) of above 140° C. The half-life temperature (T) is defined as the temperature at which the co-initiator, dissolved in benzene, half decomposes in one minute (cf. U.S. Pat. No. 3,835,107 and O. N. Tsuetkov et al, International Polymer Science and Technology 2 (1975) (4), pages T/26 to T/29).

Co-initiators preferentially used in the process of the invention are peroxides and hydroperoxides, or mixtures of peroxides and/or hydroperoxides, but the half-life temperature (T) must in every case be above 140° C. Particularly preferred peroxides and hydroperoxides are:

|     |                              | (T in ° C) |
| --- | ---------------------------- | ---------- |
| I   | Diisopropylbenzene hydroperoxide | 220    |
| II  | Cumene hydroperoxide         | 200        |
| III | Methyl isobutyl ketone peroxide | 190 – 200 |
| IV  | Di-tert.-butyl peroxide      | 186        |
| V   | Tert.-butyl perisononoate    | 161        |

The concentration of the co-initiator is, in the process of the invention, in general from 0.2 to 20 mole ppm, preferably from 0.3 to 15 mole ppm, based on the total amount of ethylene fed into the polymerization system.

Amongst suitable inert solvents for the co-initiator, aliphatic or aromatic hydrocarbons, eg. benzene, octane or gasoline, may be used advantageously. Other inert solvents, eg. chlorobenzene, cyclohexane or methanol, may also be employed. The amount of solvent required as a vehicle for the co-initiator is low compared to the amount of ethylene and is in general from 0.01 to 5 per cent by weight, preferably from 0.1 to 2 percent by weight, based on the amount of reaction gas. The solution containing co-initiators is as a rule pumped into the subsidiary stream of ethylene, but may also be added to the reactor at the point at which the subsidiary stream is fed in.

If oxygen is used as the initiator and peroxides or hydroperoxides are additionally fed in exclusively into the second reaction zone of the two-zone tubular reactor, the conversion achieved in the reaction is greatly increased without deterioration of the product properties. By adopting this measure, it is even possible to achieve an improvement in the optical properties of films manufactured from the resulting polymer. The melt index, or the haze and gloss of a film manufactured from the polymer, can be varied in a desirable manner through the choice of the co-initiator.

EXAMPLES

In all the experiments, the polymerization of ethylene was carried out in a tubular reactor with a length:diameter ratio of about 20,000. The tube walls were cooled externally with water to remove the heat of polymerization. The oxygen-containing ethylene was mixed with a molecular weight regulator and compressed to the reaction pressure. In all the examples, 2 parts of the reaction gas were fed in at the reactor inlet and 1 part was fed into the reactor near the point at which the temperature reaches a maximum (second feed point). By adopting this measure, two reaction zones are set up in the tubular reactor (two-zone tubular reactor). In a series of experiments, various peroxides and hydroperoxides or their mixtures were dissolved in gasoline and the solution was fed into the 1st reaction zone (a), which extends from the reactor inlet to approximately the second feed point, into the 2nd reaction zone (b), which starts downstream from the second feed point, or into both reaction zones.

EXAMPLE 1

Two streams of ethylene which contain 19.0 mole ppm of atmospheric oxygen and 194 mole ppm of acetone are fed simultaneously into the reactor described above. In the first reaction zone, a maximum temperature of 320° C is reached, at a reaction pressure of 2,300 bars. Additionally to the stream of ethylene gas containing oxygen and regulator, 1.0 mole ppm (based on total ethylene) of diisopropylbenzene hydroperoxide (I) in the form of a solution in gasoline, is fed into the 2nd reaction zone. In this zone, a maximum temperature of 318° C is reached. The resulting polyethylene is separated from the unconverted ethylene by conventional methods after having passed through the reactor.

COMPARATIVE EXAMPLE 1a

Two streams of ethylene which contain 19.1 mole ppm of atmospheric oxygen and 194 mole ppm of acetone are fed simultaneously into the reactor according to Example 1. At a reaction pressure of 2,300 bars, a maximum temperature of 320° C is reached in the 1st reaction zone and a maximum temperature of 315° C in the 2nd reaction zone. After leaving the reactor, the polymer is separated from the unconverted ethylene by conventional methods.

COMPARATIVE EXAMPLE 1b

Two streams of ethylene, which contain 19.1 mole ppm of atmospheric oxygen and 194 mole ppm of acetone, are fed simultaneously into the reactor according to Example 1, and the solution of compound I (1.0 mole ppm of I, based on ethylene) is fed exclusively into the 1st reaction zone and not into the 2nd reaction zone. The maximum reaction temperatures in the two reaction zones are respectively 320° and 310° C. After passing through the reactor, the polyethylene is separated from the unconverted ethylene by conventional methods.

COMPARATIVE EXAMPLE 1c

Two streams of ethylene, which contain 19.1 mole ppm of atmospheric oxygen and 194 mole ppm of acetone, are fed simultaneously into the reactor according to Example 1, and the solution of compound I (1.0 mole ppm of I, based on ethylene) is fed into both reaction zones 1 and 2, as a proportion of the gas streams. In the two reaction zones, maximum temperatures of 315° and 310° C are reached.

TABLE 1

| Experiment | Density+ of the | MFI+ | Conversion+ | Light scattering of a polyethylene film+ | Gloss+ | Parison dilation+ |
| --- | --- | --- | --- | --- | --- | --- |
| 1  | 0.922 | 3.9 | 29.3 | 16 | 116 | 38 |
| 1a | 0.922 | 3.9 | 25.6 | 16 | 115 | 38 |
| 1b | 0.922 | 3.8 | 25.7 | 16 | 108 | 43 |
| 1c | 0.922 | 3.9 | 24.6 | 40 | 76  | 43 |

| +Density | [g/cm$^3$] | according to ISO R 1183–1970 |
| --- | --- | --- |
| MFI | [g/10 min.] | melt index according to ISO R 1133-1969 |
| Conversion | [% by weight] | amount of polymer, based on ethylene fed into the reactor, and calculated in per cent |
| Light scattering of a polyethylene film | [%] | measured on a 40μm thick film according to Kunststoffe 56 (1966), 350–354 |
| Gloss | [calibrations] | measured on a 40 μm thick film, using the gloss meter from B. Lange, Berlin |
| Parison dilation | [%] | parison dilation according to DIN 53,735 |

The comparative examples show the unexpected and surprising advantages of the process according to the invention. Only if the co-initiator I is fed into the 2nd reaction zone is the conversion achieved without deterioration of the product quality. Under the experimental conditions, the differences in the stated maximum temperatures are unimportant and are within the limits of accuracy of the measurements.

EXAMPLE 2

Two streams of ethylene, containing 19.1 mole ppm of atmospheric oxygen and 194 mole ppm of acetone, are fed simultaneously into the tubular reactor of Example 1. In the 1st reaction zone, a maximum temperature of 320° C is reached, at a reaction pressure of 2,300 bars. In addition of the stream of ethylene gas, containing oxygen and regulator, an amount of 1.8 mole ppm (based on total ethylene) of cumene hydroperoxide (II), in the form of a solution in gasoline, is fed into the 2nd reaction zone. In this zone, a maximum temperature of 325° C is reached. The resulting polyethylene has a density of 0.922 [g/cm$^3$] and an MFI of 4.0 [g/10 min.]. The conversion is 26.1%. A 40 μm thick film of this polymer has a haze of 16% and a gloss of 116 [calibrations]. The parison dilation is 43%.

COMPARATIVE EXAMPLE 2

The polymerization is carried out in the tubular reactor of Example 1, under the experimental conditions of Example 2, but without feeding any compound II into the 2nd reaction zone. The polymer, obtained with a conversion of 25.1%, has a density of 0.922 [g/cm$^3$] and an MFI of 4.0 [g/10 min.[. A 40 μm thick film has a haze of 16% and a gloss of 116 [calibrations]. The parison dilation is 38%.

EXAMPLE 3

Two streams of ethylene, containing 29.8 mole ppm of atmospheric oxygen and 448 mole ppm of propane, are fed simultaneously into the tubular reactor of Example 1. In the 1st reaction zone, a maximum temperature of 320° C is reached at a reaction pressure of 2,300 bars. In addition to the stream of ethylene gas containing oxygen and regulator, an amount of 1.0 mole ppm of methyl isobutyl ketone peroxide (III), in the form of a solution in gasoline, is fed into the 2nd reaction zone. In this zone, a maximum temperature of 315° C is reached. The polymer, obtained with a conversion of 23.4%, has a density of 0.918 [g/cm$^3$], an MFI of 1.8 [g/10 min]. and a parison dilation of 43%. The haze of a 40 μm thick film is 46% and the gloss is 53 [calibrations].

COMPARATIVE EXAMPLE 3

The polymerization is carried out under the conditions of Example 3, but without addition of compound III to the 2nd reaction zone. The polymer, obtained with a conversion of 20.9%, has a density of 0.919 [g/cm$^3$], an MFI of 1.8 [g/10 min.] and a parison dilation of 64%. The haze of a 40 μm thick film is 66% and the gloss is 34 [calibrations].

EXAMPLE 4

Two streams of ethylene, containing 19.0 mole ppm of atmospheric oxygen and 194 mole ppm of acetone, are fed simultaneously, at a pressure of 2,300 bars, into the tubular reactor of Example 1. In the 1st reaction zone, a maximum temperature of 320° C is reached at a pressure of 2,200 bars. Additionally, a mixture of 1.5 mole ppm of di-tert.-butyl peroxide (IV) and 2.3 mole ppm (based on total ethylene) of tert.-butyl perisononoate (V), dissolved in gasoline, is fed into the 2nd reaction zone. The maximum temperature in the 2nd reaction zone is 322° C. The polymer, obtained with a conversion of 27.6%, has a density of 0.923 [g/cm$^3$], an MFI of 4.1 [g/10 min.] and a parison dilation of 40%. The haze of a 40 μm thick film is 13% and the gloss is 117 [calibrations].

COMPARATIVE EXAMPLE 4

The polymerization is carried out under the conditions of Example 4, but without adding compounds IV and V to the 2nd reaction zone. The polyethylene, obtained with a conversion of 25.0%, has a density of 0.922 [g/cm$^3$], an MFI of 4.0 [g/10 min.] and a parison dilation of 38%. A 40 μm thick film has a haze of 16% and a gloss of 116 [calibrations].

EXAMPLE 5

Two streams of ethylene, containing 45.9 mole ppm of atmospheric oxygen and 321 mole ppm of propane, are fed simultaneously, at a pressure of 2,000 bars, into the reactor described in Example 1. A maximum temperature of 315° C is reached in the 1st and 2nd reaction zones. In addition, the amounts of compound V shown in Table 2, in the form of a solution in gasoline, are added to the 2nd reaction zone of the reactor. The polymer is isolated, and examined, by conventional methods.

TABLE 2

| V Mole ppm (based on total ethylene) | Density of the polyethylene [g/cm$^3$] | MFI [g/10 min.] | Conversion [%] | Parison dilation [%] | Light scattering [%] | Gloss [calibrations] |
|---|---|---|---|---|---|---|
| — | 0.917 | 6.3 | 20.2 | 40 | 65 | 41 |
| 2.1 | 0.917 | 6.2 | 20.7 | 43 | 57 | 50 |
| 9.8 | 0.917 | 6.3 | 21.0 | 48 | 52 | 54 |
| 41.3 | 0.917 | 6.2 | 21.2 | 49 | 45 | 59 |

The object of the experiment is to modify the parison dilation and the optical properties of the films without altering the remaining characteristics of the product. This is not possible by conventional methods.

EXAMPLE 6

Two streams of ethylene, containing 23.9 mole ppm of atmospheric oxygen and 200 mole ppm of acetone, are fed simultaneously, at a pressure of 2,300 bars, into the reactor described in Example 1. In the 1st reaction zone, a maximum temperature of 320° C is reached. 6.0 mole ppm of tert.-butyl perpivalate (VI) ($T = 110°$ C) and/or tert.-butyl per-2-ethylhexanoate (VII) ($T = 124°$ C) are fed, individually or as a mixture, into the 2nd reaction zone. A maximum temperature of 315° C is reached. The polymer is isolated, and examined, by conventional methods.

TABLE 3

| Peroxide | Density of the polyethylene [g/cm$^3$] | MFI [g/10 min.] | Conversion [%] |
|---|---|---|---|
| — | 0.922 | 3.9 | 25.3 |
| VI | 0.922 | 3.8 | 25.3 |
| VII | 0.921 | 3.9 | 25.3 |
| VI + VII | 0.922 | 3.9 | 25.4 |

| Parison dilation [%] | Light scattering [%] | [calibrations] |
|---|---|---|
| 38 | 16 | 120 |
| 40 | 19 | 110 |
| 38 | 24 | 77 |

TABLE 3-continued

| 40 | 19 | 97 |
| --- | --- | --- |

This example shows that only free-radical co-initiators having a half-life temperature (T) above 140° C are effective in achieving improved conversion in the reaction, without adverse changes in the product properties.

We claim:

1. A process for the manufacture of an ethylene polymer by homopolymerization of ethylene or copolymerization of ethylene with a copolymerizable comonomer, in a continuously operated tubular polymerization system at a pressure of from 500 to 5,000 bars and at a temperature of from 50° to 450° C, in the presence of a polymerization initiator which generates free radicals, by feeding a mixture of ethylene, oxygen and regulator, with or without comonomer, into the polymerization system at its inlet and at the same time at a second point downstream from the inlet along the polymerization system where the reaction temperature reaches a maximum, wherein a co-initiator which has a half-life temperature, measured in benzene, of above 140° C is additionally fed in exclusively at the second feed point.

2. A process as claimed in claim 1, wherein the concentration of the co-initiator fed in at the second point is from 0.2 to 20 mole ppm, based on the total amount of ethylene fed into the polymerization system.

3. A process as claimed in claim 1, wherein the co-initiator is a peroxide.

4. A process as claimed in claim 1, wherein the co-initiator is a hydroperoxide.

5. A process as claimed in claim 1, wherein the co-initiator is a mixture of peroxide and hydroperoxide.

* * * * *